(12) United States Patent
Sarkar et al.

(10) Patent No.: US 10,423,823 B1
(45) Date of Patent: Sep. 24, 2019

(54) UNCONSTRAINED EAR RECOGNITION USING A COMBINATION OF DEEP LEARNING AND HANDCRAFTED FEATURES

(71) Applicants: Sudeep Sarkar, Tampa, FL (US); Mauricio Pamplona Segundo, Tampa, FL (US); Earnest Eugene Hansley, Tampa, FL (US)

(72) Inventors: Sudeep Sarkar, Tampa, FL (US); Mauricio Pamplona Segundo, Tampa, FL (US); Earnest Eugene Hansley, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/222,092

(22) Filed: Dec. 17, 2018

Related U.S. Application Data

(60) Provisional application No. 62/644,815, filed on Mar. 19, 2018.

(51) Int. Cl.
*G06K 9/00* (2006.01)
*G06T 3/40* (2006.01)
*G06N 3/08* (2006.01)
*G06N 20/00* (2019.01)

(52) U.S. Cl.
CPC ..... *G06K 9/00362* (2013.01); *G06K 9/00523* (2013.01); *G06K 9/00536* (2013.01); *G06N 3/08* (2013.01); *G06N 20/00* (2019.01); *G06T 3/40* (2013.01)

(58) Field of Classification Search
None
See application file for complete search history.

(56) References Cited

U.S. PATENT DOCUMENTS

| | | |
|---|---|---|
| 9,049,983 B1 | 6/2015 | Baldwin |
| 2012/0185397 A1 | 7/2012 | Levovitz |
| 2014/0099992 A1 | 4/2014 | Burns et al. |
| 2014/0169641 A1 | 6/2014 | Lee et al. |
| 2015/0347734 A1 | 12/2015 | Beigi |
| 2017/0091595 A1* | 3/2017 | Wang ............ G06F 21/32 |

(Continued)

OTHER PUBLICATIONS

Hansley et al. Employing fusion of learned and handcrafted features for unconstrained ear recognition, IET Biometrics, Special Issue: Unconstrained Ear Recognition, Oct. 1, 2017, doi: 10.1049/iet-bmt.2017.0210, www.ietdl.org, ISSN 2047-4938 (Year: 2017).*

(Continued)

*Primary Examiner* — Tahmina N Ansari
(74) *Attorney, Agent, or Firm* — Molly L. Sauter; Smith & Hopen, P.A.

(57) ABSTRACT

A system and method for identifying a subject based upon ear recognition using a convolutional neural network (CNN) and handcrafted features, wherein an ear in an image is cropped using ground truth annotations and landmark detection is performed to obtain the information required to normalize pose and scale variations. The normalized images are then described by different feature extractors and matched through distance metrics. Finally, scores are fused and a subject identification decision is made.

20 Claims, 10 Drawing Sheets

(56) References Cited

U.S. PATENT DOCUMENTS

2017/0236017 A1* 8/2017 Neumann .......... G06K 9/00885
382/115
2018/0107887 A1* 4/2018 Huber, Jr. .......... G06K 9/00449

OTHER PUBLICATIONS

Eyiokur et al. Domain adaptation for ear recognition using deep convolutional neural networks, IET Biometrics, Special Issue: Unconstrained Ear Recognition, Oct. 1, 2017, doi: 10.1049/iet-bmt.2017.0209, www.ietdl.org, ISSN 2047-4938 (Year: 2017).*

Emersic et al. Training Convolutional Neural Networks with Limited Training Data for Ear Recognition in the Wild, 2017 12th IEEE International Conference on Automatic Face & Gesture Recognition (FG 2017), Nov. 2017, pp. 987-994 (Year: 2017).*

Kumar and Wu. Automated human identification using ear imaging. Pattern Recogn. 2012. vol. 45: 956-968.

Yan and Bowyer. Empirical evaluation of advanced ear biometrics. IEEE Conf. Computer Vision and Pattern Recognition Workshops. 2005: 1-8.

Emersic et al., Ear recognition: more than a survey. Neurocomputing. 2017. vol. 255: 26-39.

Emersic et al., The unconstrained ear recognition challenge. IEEE Int. Joint Conf. on Biometrics (IJCB). 2017: 715-724.

Zhang and Mu. Ear detection under uncontrolled conditions with multiple scale faster region-based convolutional neural networks. Symmetry. 2017. vol. 9 (No. 53): 1-19.

Emersic et al., Convolutional encoder-decoder networks for pixel-wise ear detection and segmentation. IET Biometrics. 2018. vol. 7 (Issue 3):, May 2018.

Frejlichowski and Tyszkiewicz. The west pomeranian university of technology ear database—a tool for testing biometric algorithms. Int. Conf. Image Analysis and Recognition (ICIAR). Part II. LNCS. 2010. vol. 6112: 227-234.

Zhou and Zaferiou. Deformable models of ears in-the-wild for alignment and recognition. IEEE 12th Int. Conf. Automatic Face & Gesture Recognition. 2017: 626-633.

* cited by examiner

1st MaxPool

2nd MaxPool

3rd MaxPool

4th MaxPool

1st MaxPool

2nd MaxPool

3rd MaxPool

4th MaxPool

1st MaxPool

2nd MaxPool

3rd MaxPool

4th MaxPool

UNCONSTRAINED EAR RECOGNITION USING A COMBINATION OF DEEP LEARNING AND HANDCRAFTED FEATURES

CROSS-REFERENCE TO RELATED APPLICATIONS

This application claims priority to U.S. Provisional Patent Application No. 62/644,815 filed on Mar. 19, 2018, entitled "Unconstrained Ear Recognition Using a Combination of Deep Learning and Handcrafted Features", the entirety of which is incorporated by reference herein.

BACKGROUND OF THE INVENTION

Various researchers have shown that ear recognition is a viable alternative to more common biometrics, such as fingerprint, face and iris. The ear is stable over time, less invasive to capture, and does not require as much control during image acquisition as other biometrics. It is reasonable to assert that there are fewer privacy issues for the ear than there are for the face.

Traditionally, ear recognition research has been performed on ear images that were captured in an ideal setting. In an ideal setting, the ears are all captured in the same position, with identical lighting, and identical resolution. With the advances in computer vision and pattern recognition techniques, research of ear recognition is shifting to a more challenging scenario whereby ear images are acquired from real-world settings, commonly referred to as "unconstrained ears" or "ears in the wild".

FIG. 1 illustrates the difficulty in recognizing individuals using ears in the wild. FIG. 1 illustrates the challenging task for ear recognition in an unconstrained setting wherein one is given five images of four different subjects and asked to determine which pair of images belongs to the same person. This specific example primarily illustrates the problem of pose variation, but many other factors may affect the recognition performance, such as different acquisition devices, low resolution, illumination variations, occlusions caused by hair and head accessories, earrings, headsets and so on. To overcome these recognition challenges, ear recognition must achieve good results for non-cooperative subjects. This will make ear biometric recognition very useful for practical purposes, like video surveillance and continuous authentication.

Accordingly, what is needed in the art is an improved method for ear biometric recognition. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for an improved method for ear biometric recognition is met by a new, useful, and nonobvious invention.

In various embodiments, the present invention provides an unconstrained ear recognition framework that outperforms state-of-the-art systems in different publicly available image databases. A convolutional neural network (CNN) based solution is provided for ear normalization and description, which utilizes well-known handcrafted descriptors, and wherein learned and handcrafted features are fused to improve recognition. A two-stage landmark detector is provided that successfully operates under untrained scenarios. The results are generated to perform a geometric image normalization that boosts the performance of all evaluated descriptors.

In one embodiment, the present invention provides a method for ear biometric identification of a subject of interest. The method includes, acquiring, from an image capture device coupled to a computing device, an image of a subject of interest, wherein the image includes an ear of the subject of interest. The method further includes, extracting an image of the ear of the subject of interest from the image of the subject of interest, detecting a plurality of landmarks of the image of the ear of the subject of interest, normalizing the image of the ear to a standard configuration based on the plurality of detected landmarks to generate a normalized image of the ear and extracting a plurality of discriminant features from the normalized image of the ear to generate a plurality of descriptors for the normalized image of the ear, wherein the plurality of discriminant features includes Convolutional Neural Network (CNN)-learned features and handcrafted features. Following the extraction of the discriminant features, the method further includes, comparing the plurality of discriminant features extracted from the normalized image to a plurality of database images of ears to identifying a plurality of matching scores, wherein the plurality of matching scores include CCN-learned matching scores and handcrafted matching scores, fusing the CNN-learned matching scores and the handcrafted matching scores to generate a plurality of fused matching scores and determining an identify the subject of interest based upon the plurality of fused matching scores.

Extracting an image of the ear of the subject of interest from the image may include cropping the image to extract the ear and determining the ground truth location of the ear.

Normalizing the image of the ear to a standard configuration based on the plurality of detected landmarks may include reshaping the image of the ear using one or more of translating, rotating and scaling the image of the ear.

Identifying a plurality of matching scores may include comparing the plurality of discriminant features using a distance metric of the discriminant feature.

The CNN-learned matching scores and the handcrafted matching scores may be normalized prior to fusing the CNN-learned matching scores and the handcrafted matching scores.

The handcrafted features may be those detected by one or more of Histogram of Gradient (HOG) detection, Patterns of Oriented Edge Magnitudes (POEM) detection and Local Binary Pattern (LBP) detection.

In another embodiment, the present invention provides a computing device for performing ear biometric recognition. The device includes a memory and at least one processor for acquiring an image of a subject of a subject of interest, wherein the image includes an ear of the subject of interest. The device further includes, a landmark detection module operable by the at least one processor to extract an image of the ear of the subject of interest from the image of the subject of interest, to detect a plurality of landmarks of the image of the ear of the subject of interest, to normalize the image of the ear to a standard configuration based on the plurality of detected landmarks to generate a normalized image of the ear and to extract a plurality of discriminant features from the normalized image of the ear to generate a plurality of descriptors for the normalized image of the ear, wherein the plurality of discriminant features includes Convolutional Neural Network (CNN)-learned features and handcrafted features. The device further includes an ear recognition module operable by the at least one processor to compare the plurality of discriminant features extracted from the normalized image to a plurality of database images of ears to identifying a plurality of matching scores, wherein the plurality of matching scores include CCN-learned matching scores and handcrafted matching scores, to fuse the CNN-learned matching scores and the handcrafted matching scores to generate a plurality of fused matching scores and to determine an identify of the subject of interest based upon the plurality of fused matching scores.

In an additional embodiment, the present invention provide one or more non-transitory computer-readable media having computer-executable instructions for performing a method of running a software program on a computing device, the computing device operating under an operating system, the method including issuing instructions from the software program which include, acquiring, from an image capture device coupled to a computing device, an image of a subject of interest, wherein the image includes an ear of the subject of interest, extracting an image of the ear of the subject of interest from the image of the subject of interest and detecting a plurality of landmarks of the image of the ear of the subject of interest. The media further include instruction for normalizing the image of the ear to a standard configuration based on the plurality of detected landmarks to generate a normalized image of the ear, extracting a plurality of discriminant features from the normalized image of the ear to generate a plurality of descriptors for the normalized image of the ear, wherein the plurality of discriminant features includes Convolutional Neural Network (CNN)-learned features and handcrafted features, comparing the plurality of discriminant features extracted from the normalized image to a plurality of database images of ears to identifying a plurality of matching scores, wherein the plurality of matching scores include CCN-learned matching scores and handcrafted matching scores, fusing the CNN-learned matching scores and the handcrafted matching scores to generate a plurality of fused matching scores and determining an identify the subject of interest based upon the plurality of fused matching scores.

As such, in various embodiments, the present invention provides an improved method for ear biometric recognition which incorporates both CNN-learned features and handcrafted features.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In various embodiments, the present invention provides an unconstrained ear recognition framework that outperforms state-of-the-art systems in different publicly available image databases.

Figure 1:
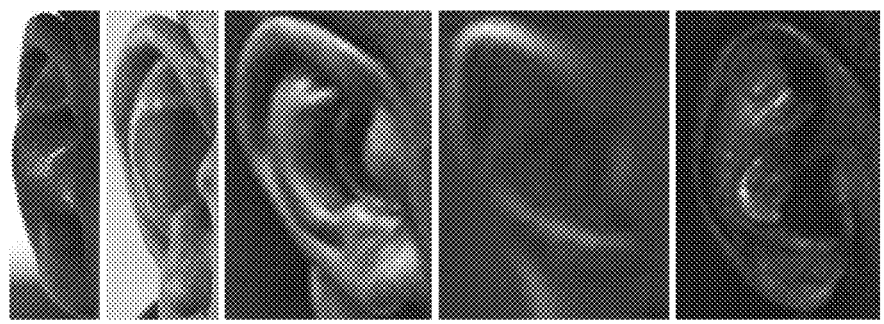
FIG. 1 is an illustration of five images of four different subjects, wherein one pair of image belongs to the same person.
Figure 2:
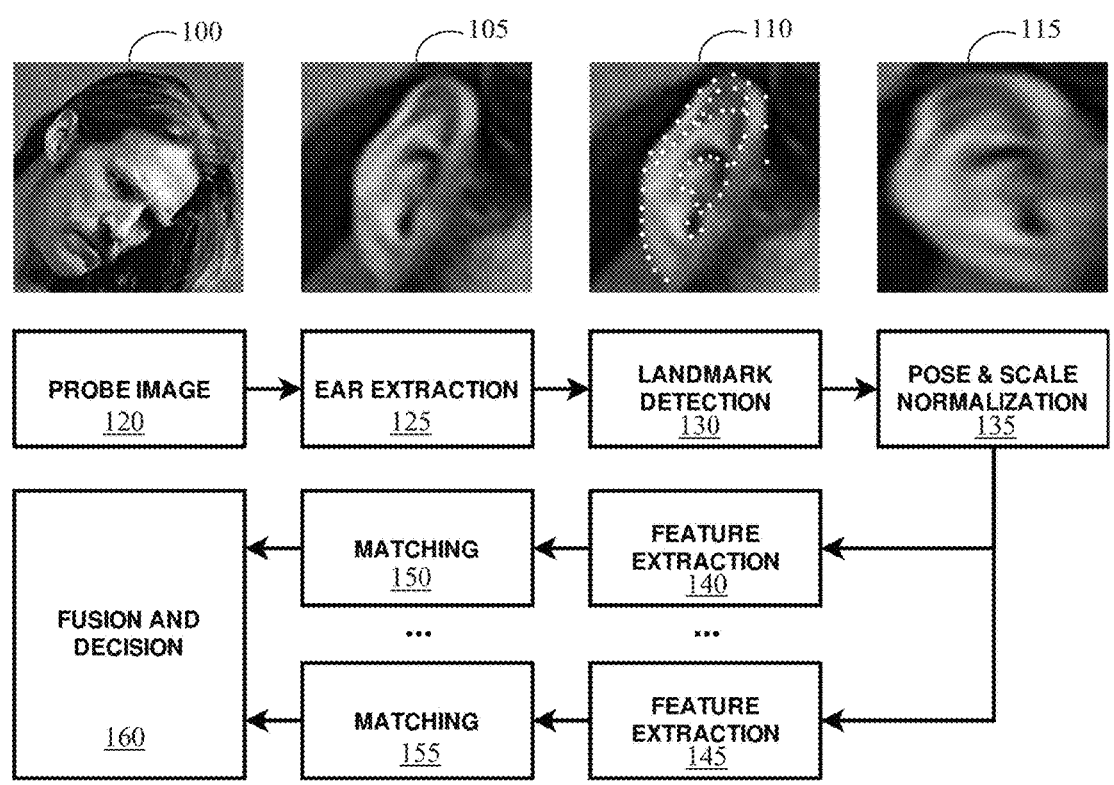
FIG. 2 is a diagram illustrating an ear recognition framework, in accordance with an embodiment of the present invention.

FIG. 2 illustrates a flow diagram of the ear recognition framework, in accordance with an embodiment of the present invention. In the present embodiment, a probe image of a subject of interest is acquired 120, in one embodiment, the probe image 100 is an unconstrained image which includes an image of an ear of a subject of interest. An image of the ear of the subject of interest 105 is then extracted 125. In one embodiment, the image of the subject of interest is cropped using ground truth annotations to extract the image of the ear. Landmark detection is then performed 130 to obtain the information required to normalize pose and scale variations. The landmarks of the ear 110 may include characteristics of the outer ear and in various embodiments may include the helix, crus antihelices, antihelix, scapha, antitragus, fossa triangularis, crus helicis, canum conchae, tragus and lobule.

Following landmark detection, pose and scale normalization is performed 135 to provide a normalized image of the ear of the subject of interest 115. The normalized images are then described by different feature extractors 140, 145 and matched 150, 155 through distance metrics. Finally, scores are fused and a recognition decision is made 160.

As shown in FIG. 2, in order to carry out the task of recognizing humans through their ears, a common sequence of steps is typically followed:

Acquisition step 120: Captures a digital biometric sample using an appropriate sensor. In these exemplary embodiments, images from five publicly available databases were used.

Localization step 125: Locates the biometric information and separates it from existing irrelevant parts of the acquired sample. In the exemplary embodiments, the images used were either already cropped or the ground truth location of the ears was provided, thus it was not necessary to perform the localization step. However, it is possible to find successful approaches that perform ear detection in the wild in the literature.

Normalization step 135: Reshapes the input sample to a standard format to reduce unwanted variations. A CNN-based landmark detector was used to locate a set of 55 landmarks, which are then employed to translate, rotate and scale the input image to a standard configuration.

Features Description step 140, 145: Selects discriminant features from a normalized sample and usually reduces its dimensionality. A state-of-the-art CNN architecture for face recognition may be used for the task of ear recognition in the wild, as well as different traditional ear description approaches.

Recognition step 160: Compares descriptors and decides whether they belong to the same person or not. All images are compared to each other using the descriptor's distance metric. All scores are normalized using min-max normalization, then score level fusion is used to combine results of different descriptors and inform the decision.

Figure 3:
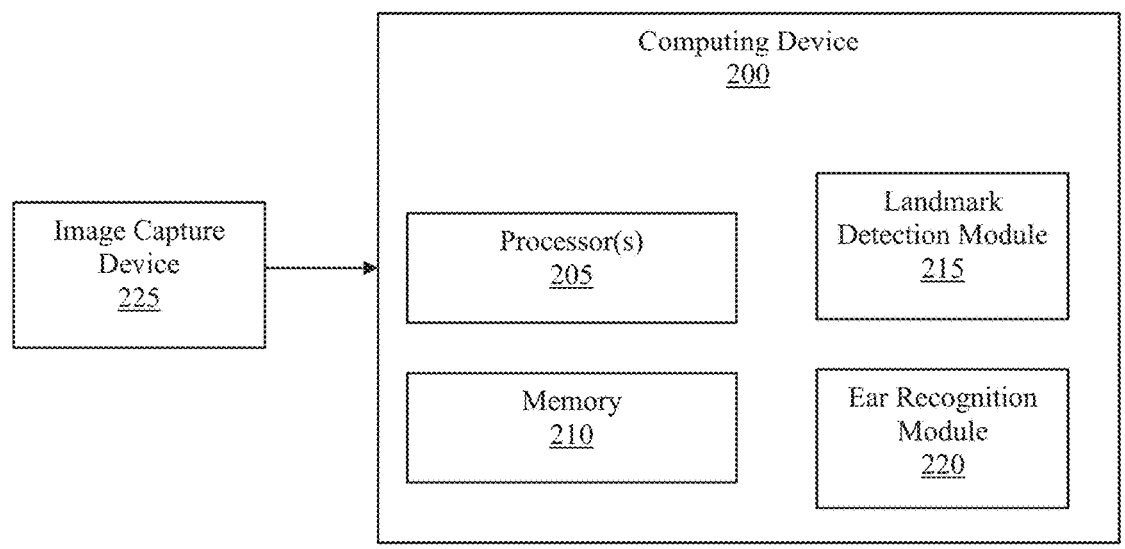
FIG. 3 is a block diagram illustrating a biometric ear recognition device, in accordance with an embodiment of the present invention.

As shown with reference to FIG. 3, a computing device 200 for performing ear recognition in accordance with the present invention may include one or more processors 205, a memory 210, a landmark detection module 210 and an ear recognition module 220. In this embodiment, the at least one processor acquires an image of a subject of a subject of interest from an image capture device 225. The acquired image includes an ear of the subject of interest. The landmark detection module 215 is operable by the at least one processor 205 to extract an image of the ear of the subject of interest from the image of the subject of interest, to detect a plurality of landmarks of the image of the ear of the subject of interest, to normalize the image of the ear to a standard configuration based on the plurality of detected landmarks to generate a normalized image of the ear and to extract a plurality of discriminant features from the normalized image of the ear to generate a plurality of descriptors for the normalized image of the ear, wherein the plurality of discriminant features includes Convolutional Neural Network (CNN)-learned features and handcrafted features. The ear recognition module is operable by the at least one processor 205 to compare the plurality of discriminant features extracted from the normalized image to a plurality of database images of ears to identifying a plurality of matching scores, wherein the plurality of matching scores include CCN-learned matching scores and handcrafted matching scores, to fuse the CNN-learned matching scores and the handcrafted matching scores to generate a plurality of fused matching scores and to determine an identify of the subject of interest based upon the plurality of fused matching scores.

The present invention provides a two-stage CNN-based landmark detector that achieves accurate results even in the presence of variations not seen in the training data. The detector can be used to automatically normalize images, thereby instantly observing a boost in the recognition rate.

The CNN-based ear descriptor of the present invention was devised based on a state-of-the-art face recognition architecture that outperforms other state-of-the-art ear recognition works that are based on CNNs. The present invention has shown that the handcrafted and learned descriptors are complementary, and thus a considerable increase in performance can be reached when both are fused.

There are many things that can affect the performance of ear recognition and some sets of ear images are easier than others. Therefore, it is a good idea for researchers to experiment with multiple image datasets, when feasible. A test may include using ideal images and then progress to using unconstrained, more difficult, images to recognize. In the exemplary embodiment of the present invention, five different databases were used to train and evaluate the novel ear recognition framework. Images from the Indian Institute of Technology Delhi Ear Database (IIT), the West Pomeranian University of Technology Ear Database (WPUTE), the Annotated Web Ears database (AWE), the In-the-wild Ear Database (ITWE) and the Unconstrained Ear Recognition Challenge database (UERC) were used.

Figure 4A:
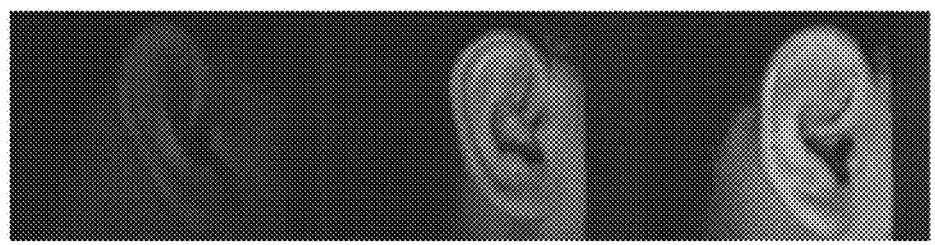
FIG. 4A illustrates example images from IIT database.

The IIT (Indian Institute of Technology Delhi Ear) database was released in two different formats, a raw version and a normalized version. The raw version was used for the present experiments. It contains 493 images with size 272×204 from 125 different subjects. Each image shows a small region around the left ear and was collected in an indoor environment and in a well-controlled acquisition setup, which makes this database a suitable benchmark for a nearly ideal ear recognition scenario. FIG. 4A shows some raw images provided by the IIT database.

Figure 4B:
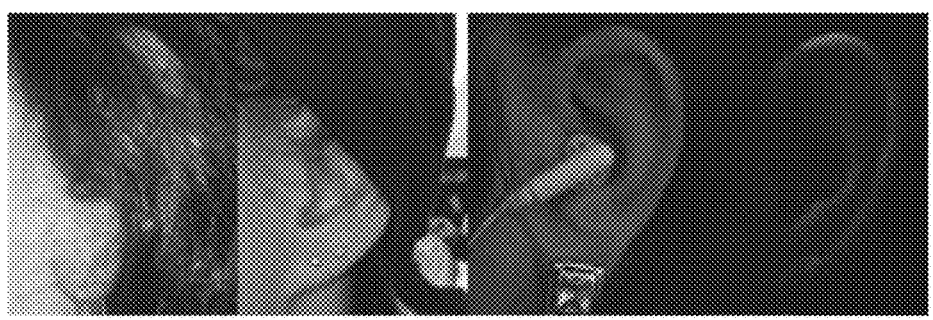
FIG. 4B illustrates example images from WPUTE database.

The WPUTE (West Pomeranian University of Technology Ear) database was originally created to evaluate the performance of ear recognition in the wild. It contains images that state-of-the-art ear recognition approaches could not handle at that time. The images reflect the challenges associated with ear recognition, such as occlusions caused by hair, earrings, and headsets. The database also provides images with variations in gender, ethnicity, pose, illumination and acquisition sensor. However, because the vast majority of same subject images were acquired during a single session, intraclass variation is minimal. Thus, although the pre-processing step was heavily affected by these variations, some of the variations could in fact benefit the recognition task (e.g. a person wearing the same earring in all acquisitions). This database provides 3348 images with size 380×500 from 474 different subjects (i.e. each subject has at least four images) showing a small region around the ear. However, 1388 of them are duplicates, which may have inflated the reported accuracy of some works in the literature, and it was also found that six images that were mistakenly labeled as left ears while they actually were right ears. After removing duplicates and fixing labels, 1960 images were available for use, 982 from left ears and 978 from right ears. Some examples of WPUTE images are shown in FIG. 4B.

Figure 4C:
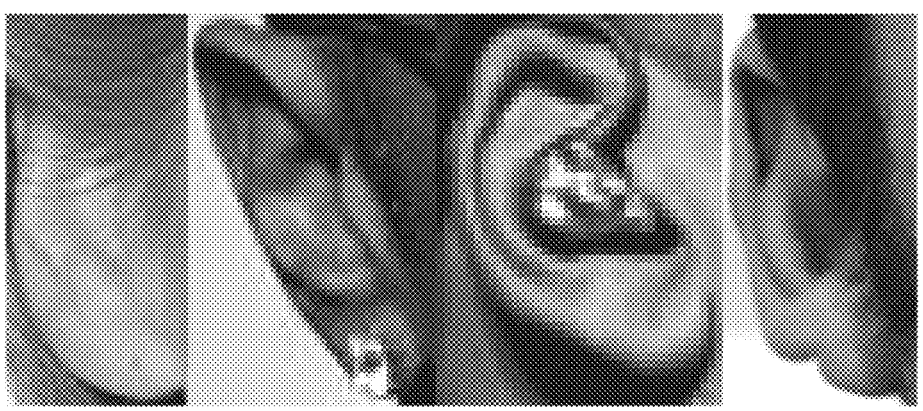
FIG. 4C illustrates example images from AWE database.
Figure 4D:
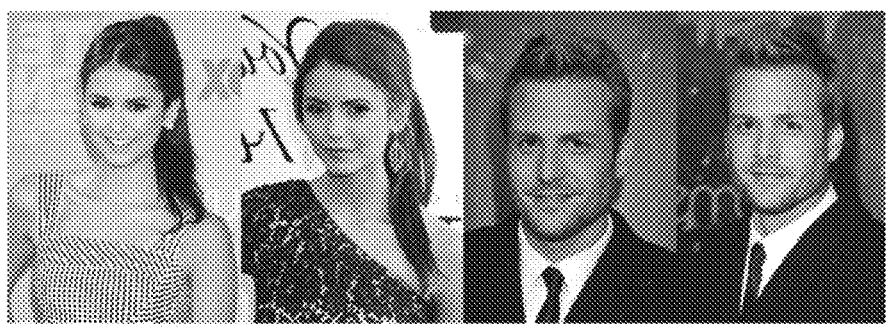
FIG. 4D illustrates example images from ITWE database.

The AWE (Annotated Web Ears) database contains 1000 images from 100 different subjects (i.e. 10 images per subject) which were collected from searches for public figures on the Internet. Image size varies from 15×29 to 473×1022 pixels, with size 83×160 on average. Ears were tightly cropped, so the proportion of background pixels is the smallest among all databases used in this work. All variations presented in the WPUTEDB database are also present in the AWE database in a more intense form. Although it labels ears as left and right, with 520 and 480 images, respectively, the images may have been inadvertently flipped horizontally before being released on the Internet. So, it is possible that there are some noisy labels. FIG. 4C showcases samples of AWE test images that depict some of the challenges encountered.

The ITWE (In-The-Wild Ear) database is divided into two sets, collection A and collection B. Collection A was collected using Google image search and contains 605 images without identity reference, but with 55 manually annotated landmarks. The position of these landmarks can be observed in FIG. 2. This collection was randomly split into a training set with 500 images and a test set with 105 images. It is suitable for training ear detection and normalisation approaches, but not for recognition purposes. For this reason, collection B was created for recognition evaluation and contains 2058 images from 231 different subjects taken from three public databases for face recognition in the wild: VGG-Face, LFW and Helen Dataset. Bounding boxes for each ear were obtained by a detector based on histograms of oriented gradients (HOG) which was trained on images from collection A, and these box coordinates were released together with this collection. Images in both collection A and collection B include cluttered backgrounds (e.g. face, body parts, scenario) and vary considerably in size and ear resolution. Variations in ear images of the ITWE database are comparable to the AWE database ones, but there is no differentiation between left and right ears (i.e. The ITWE images are horizontally flipped so that all have the same orientation), which is a problem for recognizing people with asymmetric ears (which is reported to be about 10% of people). In addition, many mislabeled samples were found. However, the mislabeled samples were not fixed for comparison purposes. Some examples of ITWE images are presented in FIG. 3D.

The UERC (Unconstrained Ear Recognition Challenge) database is an extension of the AWE database and was built for competition purposes. The major change is the number of images and subjects; it has many more. The database is divided into two parts, with 2304 images from 166 subjects for training and 9500 images from 3540 subjects for testing. The subjects designated for training have at least ten images, while subjects in the testing part may contain only one image. A portion of the subjects in training and testing (i.e. 150 and 180 subjects, respectively) have exactly ten images. Ears may be left or right oriented, but ground truth annotations of the orientation are only available for training images.

The five sets of images used in the exemplary experiments have different levels of difficulty so that a fair test can be conducted and the performance of the framework implementation of the present invention can be evaluated and then compared to the current state-of-the-art. While the IIT ear images are not unconstrained, they can be used to detect overfitting to the wild scenarios (i.e. using images from easier databases should always result in higher accuracy), which is a problem that was already observed in works that recognize faces in the wild. Although all the remaining databases are unconstrained, based on their descriptive characteristics, it was concluded that WPUTE and UERC are, respectively, the least and the most challenging unconstrained image sets, while AWE and ITWE are of similar difficulty.

Even with the recent emergence of deep learning methods for biometric recognition in uncontrolled scenarios, normalization is still necessary to achieve better results. As such, the ear recognition problem was pursued by investigating the use of CNNs for the landmark detection task. To this end, images and annotations provided in collection A of the ITWE database were used for CNN training and accuracy evaluation. As only 500 images are available for training, different data augmentation operations were performed in order to avoid overfitting and to increase the network generalization power.

For each training image, principal component analysis (PCA) on the 2D coordinates of the annotated landmarks was used to obtain the upright orientation of the ear (i.e. it is assumed that it corresponds to the direction of the first component). Then, multiple images were created by rotating the upright ear from −45° to 45° with steps of 3°. Each ear was also transformed by a random scale change of up to 20% of the original ear size in both axes, as well as a random translation of up to 20% of the original ear size in each axis. After applying all these modifications, images were rescaled to 96×96 pixels, resulting in 15,500 training images.

The architecture of the network of the present invention consists of alternating between convolution and max pooling layers in the beginning, and then following with a sequence of fully-connected layers. Max pooling is the application of a moving window across a 2D input space, where the maximum value within that window is the output. Rectified linear units in convolution and fully-connected layers were used to train models from scratch. Dropouts were also added after all max pooling and the first fully-connected layers to avoid overfitting the training data. A complete description of the architecture of the present invention is presented in Table 1. It was implemented using TensorFlow, and the optimization to minimize the mean square error in the output was carried out by the Nesterov's Momentum algorithm for 2000 epochs.

TABLE 1

Network architecture for landmark detection in ear images. It receives as input a grayscale image with 96 × 96 pixels and outputs a 110-dimensional vector representing 2D coordinates for 55 predefined landmarks.

| # | Type | Input | Filter | Stride | Drop | Output |
|---|------|-------|--------|--------|------|--------|
| 1 | Conv/Relu | 96 × 96 × 1 | 3 × 3 × 1 × 32 | 1 | | 96 × 96 × 32 |
| 2 | MaxPool | 96 × 96 × 32 | 2 × 2 | 2 | 10% | 48 × 48 × 32 |
| 3 | Conv/Relu | 48 × 48 × 32 | 2 × 2 × 32 × 64 | 1 | | 48 × 48 × 64 |
| 4 | MaxPool | 48 × 48 × 64 | 2 × 2 | 2 | 20% | 24 × 24 × 64 |
| 5 | Conv/Relu | 24 × 24 × 64 | 2 × 2 × 64 × 128 | 1 | | 24 × 24 × 128 |
| 6 | MaxPool | 24 × 24 × 128 | 2 × 2 | 9 | 30% | 12 × 12 × 128 |
| | Flattening | 12 × 12 × 128 | | | | 18432 |
| 7 | Fc/Relu | 18432 | | | 50% | 1000 |
| 8 | Fc/Relu | 1000 | | | | 1000 |
| 9 | Fc | 1000 | | | | 110 |

Although this network achieved an admirable accuracy considering the level of variations in unconstrained scenarios, a two-stage solution was also evaluated, whereby the first network is used to create an easier landmark detection scenario by reducing scale and translation variations, and the second network is used to generate the 2D coordinates for landmarks. The coordinates obtained by the network described above were used to refine the centre and the orientation of an ear using PCA and then the rectified image was fed to a second network that was trained in a more controlled scenario. The second network has the same architecture and optimization procedure of the first one, the only difference is the training data, which uses less variation in the augmentation process. Rotations are performed from −15° to 15° with steps of 1°, and random scale and translation changes are limited to up to 10% of the original ear size.

Figure 5A:
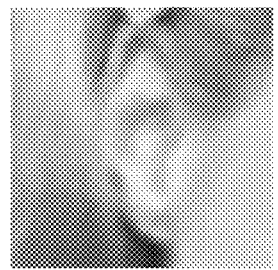
FIG. 5A is an illustration of normalization results with the same sampling rate in both axis for two ear images of the same person with a first pose, in accordance with an embodiment of the present invention.
Figure 5B:
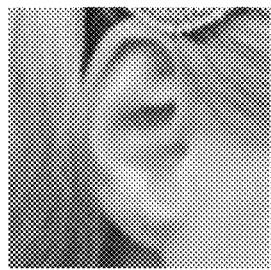
FIG. 5B is an illustration of normalization results with the same sampling rate in both axis for two ear images of the same person with a second pose, in accordance with an embodiment of the present invention.
Figure 5C:
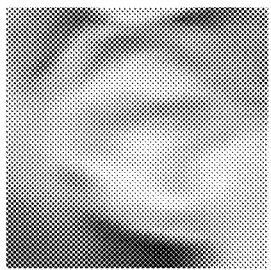
FIG. 5C is an illustration of normalization results without the same sampling rate in both axis for two ear images of the same person with a first pose, in accordance with an embodiment of the present invention.
Figure 5D:
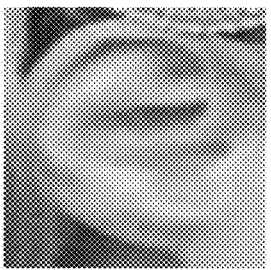
FIG. 5D is an illustration of normalization results without the same sampling rate in both axis for two ear images of the same person with a second pose, in accordance with an embodiment of the present invention.

After landmark detection, the ears were normalized by applying PCA on the retrieved landmarks. The first component is used as the orientation of the ear and the centre of the oriented bounding box is used as the centre of the ear. A 128×128 image was then interpolated with these parameters considering that the distance between the centre of the ear and the top of the image is equal to two times the square root of the first eigenvalue in the original image. However, as ears in the wild may present significant pose variations, this also occurs in width variations that may affect the recognition performance, as shown in FIG. 5A and FIG. 5B. Thus, different sampling rates in x and y directions are used in a way that the distance between the centre of the ear and one side of the image is equal to two times the square root of the second eigenvalue in the original image. This way, the width and the height of the normalized ear are approximately the same, as may be seen in FIG. 5C and FIG. 5D, and image variations caused by pose become less intense. As shown, while the ear in FIG. 5B is 25% wider than the ear in FIG. 5A, the difference in width between the ear in FIG. 5C and the ear in FIG. 5D is negligible.

reported a performance drop caused by variations in pose and illumination, and such variations are much more intense in recent uncontrolled databases. A PCA implementation available in the Face Identification Evaluation System known in the art was tested as a baseline approach, and its feature vectors were matched through the Mahalanobis distance. The first 20 eigenvectors were dropped to avoid illumination and background variations, and 60% of the eigenvectors were kept in the PCA descriptor.

As holistic features are strongly affected by different variations, specialists designed different feature extraction approaches, which are known as handcrafted features, seeking to overcome some of these problems. Emersic et al. released a toolbox that allows the extraction of the best performing state-of-the-art handcrafted features for ear recognition: local binary patterns (LBP), binarized statistical image features (BSIF), local phase quantization features (LPQ), rotation invariant LPQs (RILPQ), patterns of oriented edge magnitudes (POEM), HOG, dense scale-invariant feature transform (DSIFT) and Gabor wavelets. All descriptors were extracted using the default parameters of the toolbox. For matching, as in Emersic et al.'s work, histogram-based descriptors were compared using the chi-square distance and Gabor descriptors were compared using the cosine distance.

Considering that the performance of handcrafted descriptors degrades when using uncontrolled ear images, CNNs were explored to provide improved performance and to learn more about the images, including how to describe them in a more discriminative and concise way. The CNN that was implemented is a state-of-the-art CNN architecture employed for face recognition in the wild which was trained from scratch for the ear recognition in the wild problem. A complete description of the chosen CNN architecture is presented below as well as specific layer configurations in Table 2. This network was also implemented using TensorFlow, and the Adam optimization algorithm was used to minimize the weighted sum of softmax and centre losses. The centre loss weight was set to 0.003.

TABLE 2

Network architecture for feature extraction in ear images

| Number | Type | Input | Filter | Stride | Drop | Output |
|---|---|---|---|---|---|---|
| 1 | Conv/Relu | 128 × 128 × 1 | 3 × 3 × 1 × 128 | 1 | 10% | 128 × 128 × 128 |
| 2 | Conv/Relu | 128 × 128 × 128 | 3 × 3 × 128 × 128 | 1 | | 128 × 128 × 128 |
| 3 | MaxPool | 128 × 128 × 128 | 2 × 2 | 2 | | 64 × 64 × 128 |
| 4 | Conv/Relu | 64 × 64 × 128 | 3 × 3 × 128 × 128 | 1 | 20% | 64 × 64 × 128 |
| 5 | MaxPool | 64 × 64 × 128 | 2 × 2 | 2 | | 32 × 32 × 128 |
| 6 | Conv/Relu | 32 × 32 × 128 | 3 × 3 × 128 × 256 | 1 | 30% | 32 × 32 × 256 |
| 7 | MaxPool | 32 × 32 × 256 | 2 × 2 | 2 | — | 16 × 16 × 256 |
| 8 | Conv/Relu | 16 × 16 × 256 | 3 × 3 × 256 × 256 | 1 | — | 16 × 16 × 256 |
| 9 | MaxPool | 16 × 16 × 256 | 2 × 2 | 2 | — | 8 × 8 × 256 |
| 10 | Conv/Relu | 8 × 8 × 256 | 3 × 3 × 256 × 256 | 1 | — | 8 × 8 × 256 |
| | Flattening 9 | 8 × 8 × 256 | — | — | — | 16,384 |
| | Flattening 10 | 8 × 8 × 256 | — | — | — | 16,384 |
| | Concat 9&10 | 16,384/16,384 | — | — | — | 32,768 |
| 11 | Fc | 32,768 | — | — | — | 512 |

Three different description and matching schemes were evaluated based on (i) holistic image features, (ii) handcrafted features and (iii) learned features. It was then investigated if fusing some of them can achieve a higher accuracy. More details are given in the following description.

PCA was one of the first methods employed for the ear recognition problem, as it provides a holistic description of the sample images, while reducing the dimensionality of the data. However, even the pioneer works using PCA already This CNN outputs 512-dimensional descriptors that can be matched through the cosine distance, making the entire processing time (i.e. description and matching) comparable to that of handcrafted descriptors previously described. For a given training set, the network optimization was performed in batches of 128 images for 1000 epochs using softmax loss only, and then the weighted sum of softmax and centre losses was used until convergence was reached (i.e. no improvement after 50 epochs). As previously described, data augmentation operations were performed to increase the number of training images: random rotation between −10° and 10°; random crop with 85% to 100% of the original image size; random contrast change increasing or decreasing the range of pixel intensities in up to 50%. To help understand what kind of patterns are being encoded by the CNN, a visual analysis of some of the learned filters is provided in FIG. 6A-FIG. 6C.

Figure 6A:
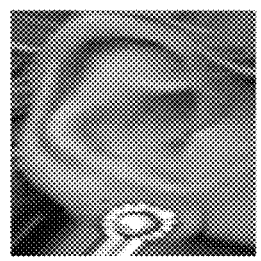
FIG. 6A is a visualization of the activations for three selected filters in each max pooling layer of the CNN for a first test image from a first person, in accordance with an embodiment of the present invention.
Figure 6A:
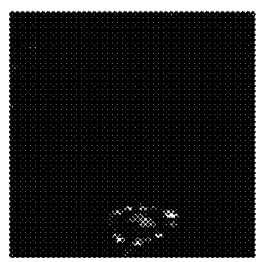
Figure 6A:
Figure 6A:
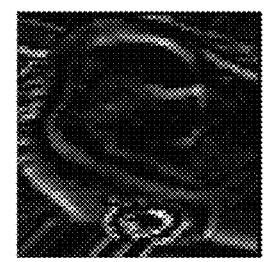
Figure 6A:
Figure 6A:
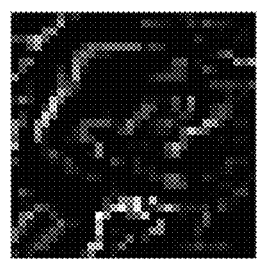
Figure 6A:
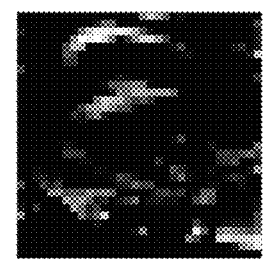
Figure 6A:
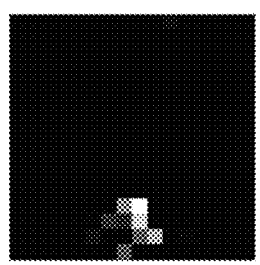
Figure 6A:
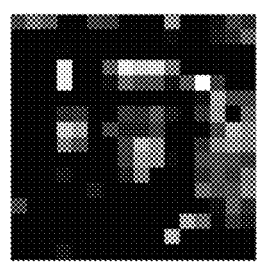
Figure 6A:
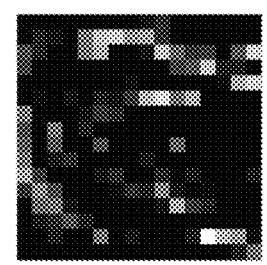
Figure 6A:
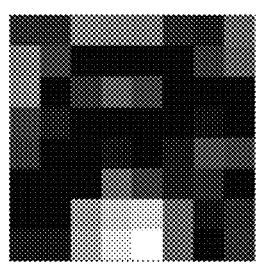
Figure 6A:
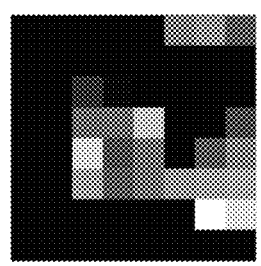
Figure 6A:
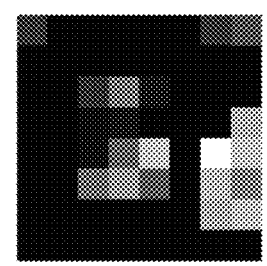
Figure 6B:
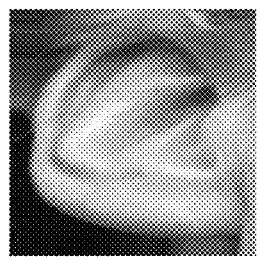
FIG. 6B is a visualization of the activations for three selected filters in each max pooling layer of the CNN for a second test image from a first person, in accordance with an embodiment of the present invention.
Figure 6B:
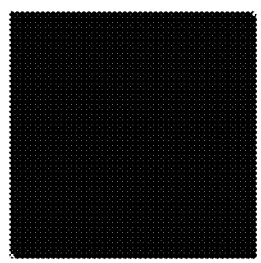
Figure 6B:
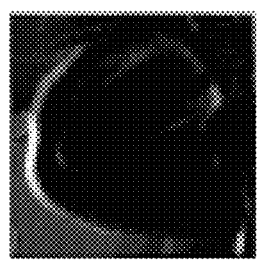
Figure 6B:
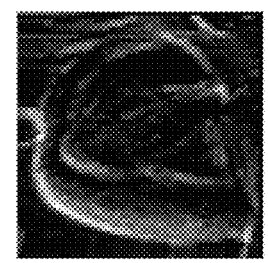
Figure 6B:
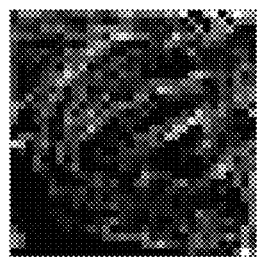
Figure 6B:
Figure 6B:
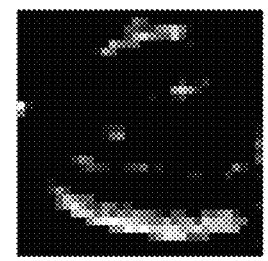
Figure 6B:
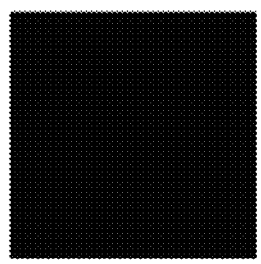
Figure 6B:
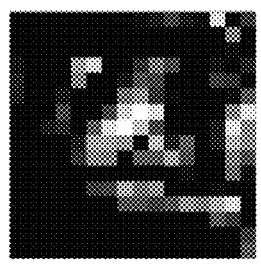
Figure 6B:
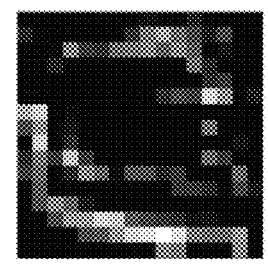
Figure 6B:
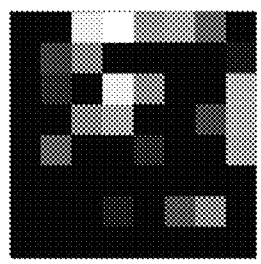
Figure 6B:
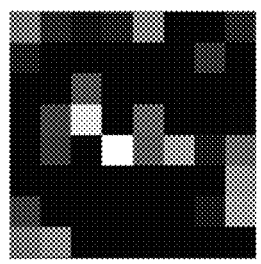
Figure 6B:
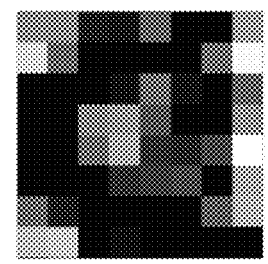
Figure 6C:
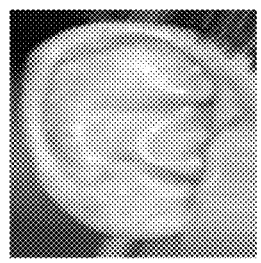
FIG. 6C is a visualization of the activations for three selected filters in each max pooling layer of the CNN for a first test image from a second person, in accordance with an embodiment of the present invention.
Figure 6C:
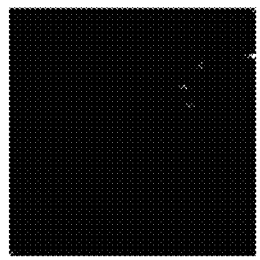
Figure 6C:
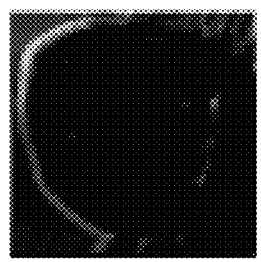
Figure 6C:
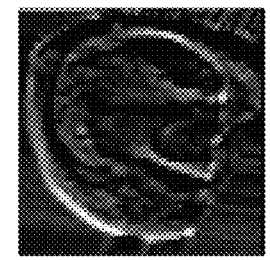
Figure 6C:
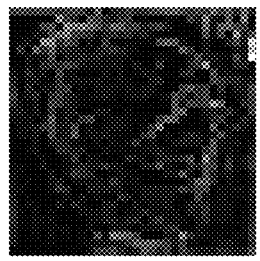
Figure 6C:
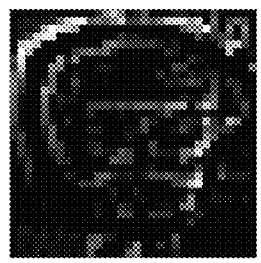
Figure 6C:
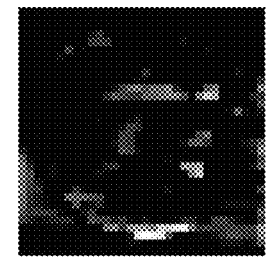
Figure 6C:
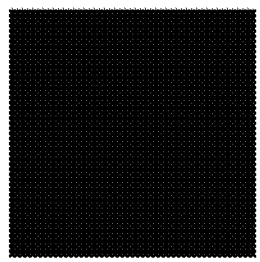
Figure 6C:
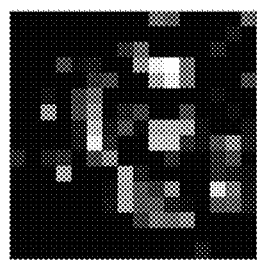
Figure 6C:
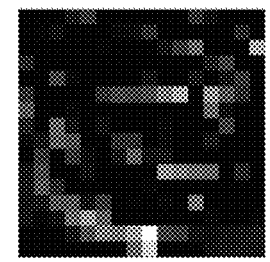
Figure 6C:
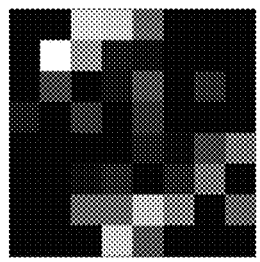
Figure 6C:
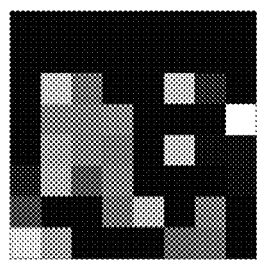
Figure 6C:
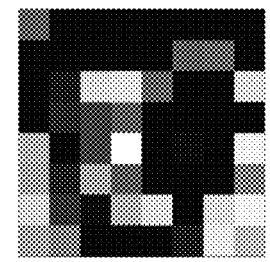

FIG. 6A-FIG. 6C provide visualization of the activations for three selected filters in each max pooling layer of the CNN for three different test images, the first two (FIG. 6A and FIG. 6B) from a same person and the third one (FIG. 6C) from a different subject. In the interpretation, the first column of activations in all of them illustrate the perception of presence/absence of earrings. As may be observed, even for images from the same subject, as in FIG. 6A and FIG. 6B, the first column has more intense activations in the bottom part of the image when there is an earring in the image. The second and third columns for each image were used to show different concepts learned in different depths of the network. The first max pooling layer usually contains low level features, such as the vertical and horizontal edges. In the second layer, more complex concepts are encountered, such as helix contours and borders from specific ear parts. As one goes deeper into the network, it becomes harder to interpret the meaning of the features, although one can always find some activations concentrated in specific parts of the ear, such as concha contours in the third layer and internal ear parts in the fourth layer.

There are different kinds of multimodal systems that address problems associated with single modality systems, but a multimodal system based on multiple matchers is the most adequate one for wild scenarios. The reason is that it is not always possible to have multiple biometric traits (e.g. face and ear), multiple units of a biometric trait (e.g. thumb and index fingerprints) or multiple samples of the same biometric trait (e.g. face in video), but multiple matching techniques can always be applied to a single biometric sample.

In order to fuse matchers based on the descriptors previously presented, different fusion schemes were evaluated at score levels, such as sum, min, max and product rules, and chose the sum rule, as it achieved the best results in the experiments. Before fusion, score normalization is carried out considering an identification scenario, where the only scores available at a single time are the ones between the probe and all gallery images. To this end, the minimum and maximum score values were discovered and then a min-max normalization was performed.

Experiments were designed to validate each module of the recognition framework. Thus, in the following sections separate results for landmark detection, geometric normalization, CNN-based description and descriptor fusion are presented. The results of the present invention are also compared to the state-of-the-art, when possible.

Previous researchers, Zhou and Zaferiou, evaluated different variations of active appearance models (AAMs) using the test set from ITWE's collection A. Their best result was achieved by training a holistic AAM based on scale-invariant feature transformation features. As initialization for their landmark detector, they used a HOG-based ear detector. They computed the cumulative error distribution using the test set of the same database, where the error for an image is the normalized point-to-point error with respect to the diagonal of the bounding box for the ground truth annotations. Their best result is shown as a line with solid squares in FIG. 7.

Figure 7:
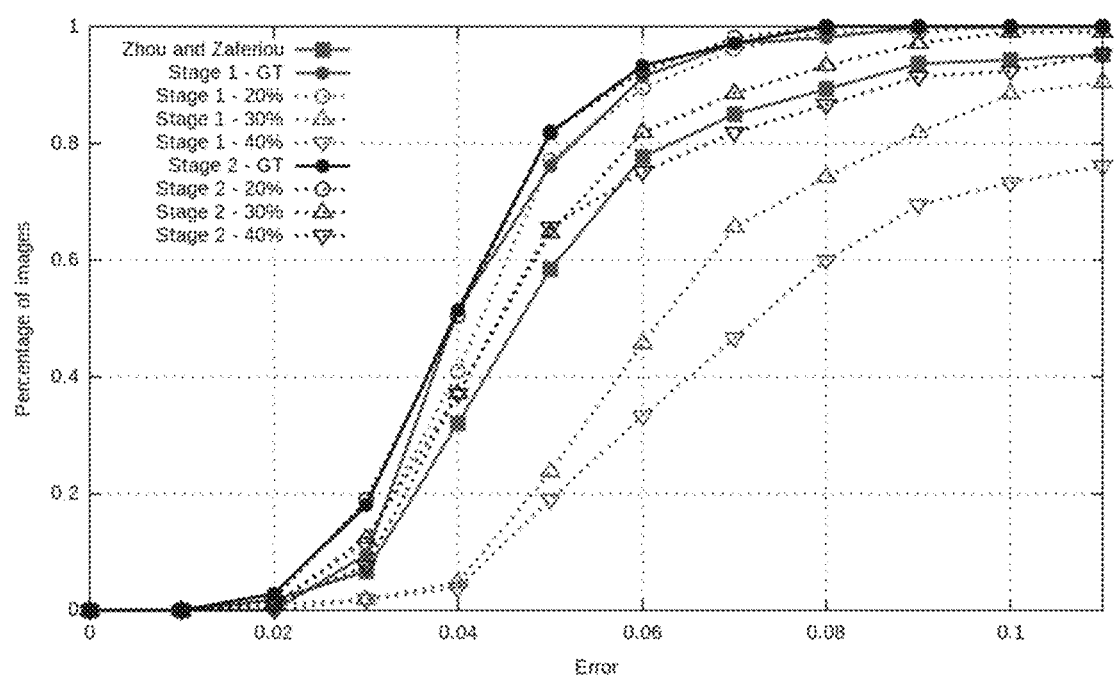
FIG. 7 is a graphical illustration of the cumulative error distribution for landmark detection using the proposed approach and Zhou and Zaferiou's approach.

The same evaluation was performed for the proposed landmark detector of the present invention in four different scenarios. In the first one, the ground truth annotations were used to obtain the centre and the size of the ear. This reflects the performance of the method in a perfect scenario, in which ear's location and size are reliably retrieved by an ear detector. Then, to simulate scenarios in which the ear detector does not perform that well, random variations were added with up to 20%, 30% and 40% of the ear size to the ground truth values of the first scenario, yielding four scenarios for comparison. Results for these four scenarios are also shown in FIG. 7. As may be observed, the two-stage landmark detector performs slightly better than the single-stage one when using up to 20% of variation, and there is no significant difference in performance between ground truth initialization and an initialization with 20% of variation. This is expected, as this amount of variation was taken into account during the training stage. For larger variations that are unknown to the training, a single-stage landmark detector can have a considerable drop in performance, but the two-stage solution of the present invention does not experience a considerable drop. As depicted in FIG. 7, in this situation, its performance is comparable to the state-of-the-art.

Since there is no normalization ground truth, the benefits of the normalization process were evaluated as previously described by checking the difference in the recognition performance with and without normalization for different handcrafted descriptors. To this end, all images from the AWE database were normalized and followed the same protocol proposed by Emersic et al. that was released in their toolbox. The development set was used that contains 60% of the AWE images. A 10-fold cross-validation was performed, and the mean accuracy and standard deviation are reported in Table 3. It is worth highlighting that even images that were not correctly normalized were still used in all recognition experiments, and that all folds are exactly the same in the present invention and Emersic et al.'s works. Table 3 shows Emersic et al.'s results, the current reproduction of their experiments and the current results using normalized images in terms of rank-1 and equal error rate (EER). It is possible to observe that the present results without normalization are very similar to the ones reported by Emersic et al., showing that the reproduction of their experiments was successful, and that the present results with normalization yielded higher rank-1 recognition rates for all features and a lower EER in most of the cases. These results illustrate that an effective normalization approach can help improve performance when using description techniques that are not necessarily robust to wild ear variations.

TABLE 3

Rank-1 and EER results for the AWE database as reported by Emersic et al. [4] and as in our reproduction of their experiments using images with (norm) and without (raw) normalization.

| | Emersic et al.'s work | | This work (raw) | | This work (norm) | |
|---|---|---|---|---|---|---|
| Method | Rank-1 | EER | Rank-1 | EER | Rank-1 | EER |
| LBP | 43.5 ± 7.1 | 32.0 ± 7.4 | 43.5 ± 7.1 | 32.3 ± 2.2 | 50.5 ± 6.8 | 29.8 ± 2.2 |
| BSIF | 48.4 ± 6.8 | 30.0 ± 9.6 | 48.4 ± 6.4 | 30.2 ± 2.9 | 53.1 ± 7.8 | 30.8 ± 2.7 |
| LPQ | 42.8 ± 7.1 | 30.0 ± 7.4 | 42.6 ± 7.0 | 31.7 ± 2.7 | 47.8 ± 8.9 | 29.7 ± 3.4 |
| RILPQ | 43.3 ± 9.4 | 34.0 ± 6.4 | 43.5 ± 9.2 | 34.3 ± 3.2 | 46.4 ± 8.4 | 33.8 ± 4.3 |

TABLE 3-continued

Rank-1 and EER results for the AWE database as reported by Emersic et al. [4] and as in our reproduction of their experiments using images with (norm) and without (raw) normalization.

| | Emersic et al.'s work | | This work (raw) | | This work (norm) | |
|---|---|---|---|---|---|---|
| Method | Rank-1 | EER | Rank-1 | EER | Rank-1 | EER |
| POEM | 49.6 ± 6.8 | 29.1 ± 9.1 | 49.6 ± 8.8 | 29.8 ± 2.6 | 54.3 ± 7.8 | 30.6 ± 4.3 |
| HOG | 43.9 ± 7.9 | 31.9 ± 7.8 | 48.1 ± 8.8 | 30.5 ± 2.1 | 57.1 ± 8.1 | 26.8 ± 3.6 |
| DSIFT | 43.4 ± 8.6 | 30.9 ± 8.4 | 42.2 ± 9.0 | 33.1 ± 2.8 | 45.8 ± 10.3 | 33.2 ± 3.1 |
| Gabor | 39.8 ± 7.1 | 32.1 ± 8.1 | 39.8 ± 7.1 | 31.7 ± 3.8 | 42.6 ± 6.2 | 30.7 ± 3.4 |

In order to learn features for the problem of recognizing ears in the wild, each of the IIT, WPUTE, AWE and ITWE databases were divided into two sets, one for training and one for testing. The segregation was conducted in a subject-independent way (i.e. no subject has images in both training and testing sets) by taking the first half of the subjects rounded up and using their images for training and using the remaining ones for testing. Before the automatic normalization process, both left and right ear images were flipped so that all ears would have the same orientation. Then, each image in the training set was normalized and transformed into a set of 20 modified images during the data augmentation stage and five different descriptors were trained: one for each of the four database training set and one using all of these training sets combined. The EER performance of these five descriptors was evaluated by performing an all-versus-all comparison in all testing sets available. The results are presented in Table 4. As may be observed, the best performance for all unconstrained testing sets was obtained by the descriptor learned using all training sets, followed by the descriptor learned using the training set from the same database. This shows that every database has different types of variations that tend to be overrepresented in models learned from a single database. When all databases are combined, the model benefits from both a wider training set (i.e. more subjects) and less database overfitting. The models do not appear to be overfitting the unconstrained images, as the performance for the IIT test set is about 2% for all models.

TABLE 4

EER results for all testing sets using descriptors learned from each database or from all databases combined. Each row represents a different CNN descriptor and each column shows the accuracy for a specific database.

| | TEST | | | | | |
|---|---|---|---|---|---|---|
| TRAIN | IIT | WPUTE | WPUTE* | AWE | AWE* | ITWE |
| IIT | 1.76% | 29.62% | 25.85% | 35.29% | 33.56% | 35.47% |
| WPUTE | 2.12% | 15.95% | 9.40% | 29.87% | 28.33% | 29.46% |
| AWE | 2.12% | 25.03% | 20.04% | 26.53% | 23.52% | 25.68% |
| ITWE | 2.37% | 23.50% | 18.93% | 27.51% | 25.30% | 22.09% |
| ALL | 2.59% | 15.17% | 9.59% | 25.42% | 22.93% | 19.68% |

*As WPUTE and AWE distinguish left and right ears we also show results considering only genuine matchings between ear images from the same side of the head.

It is also shown in Table 4 that knowing whether the image is of the left ear or right ear is helpful during the recognition process. If one only considers genuine matchings as the matchings between ear images from the same side of the head, the EER is reduced in about 4-6% for the WPUTE database and in about 2-3% for the AWE database in all tests. These results corroborate with previous findings regarding ear asymmetry, but in an uncontrolled scenario. However, it is not always possible to have this information, so ear asymmetry was not considered in the following experiments and classified matchings between different ears of the same person as genuine.

Zhou and Zaferiou used transfer learning in order to employ CNN descriptors previously trained in a different domain for ear recognition. To this end, they evaluated both support vector machines and linear discriminant analysis for matching those descriptors and achieved about 30% EER for the ITWE database. Their testing/training proportion was 80%/20%, and the division was not made in a subject-independent manner. Even though the present embodiment considered a more difficult scenario, with a 50%/50% testing/training subject-independent split, it still achieved a considerably lower EER in all cases where a true unconstrained database was used for training (i.e. AWE, ITWE and ALL), as may be observed in Table 4. These results show that even when a small number of images are available for the ear domain, it may be worth while to train a domain-specific CNN.

The first round of fusion experiments was performed using the testing set of the AWE database, since this was the most challenging one in the previous experiment. The fusion of all possible pairs of features was evaluated, including all holistic, handcrafted and learned features previously presented. The chosen CNN model was the one with the best result in Table 4 (all). Table 5 shows individual results for each feature, as well as the top fusion results in terms of rank-1, rank-5, area under curve (AUC) and EER.

TABLE 5

Individual and fusion results for all descriptors in Section 5 using the AWE database. Individual results were grouped by descriptor type, and handcrafted features were grouped in to categories, the first one (Handcrafted I) for methods based on neighborhood encoding and the second one (Handcrafted II) for methods based on gradient orientations.

| Type | Descriptors | Rank-1 | Rank-5 | AUC | EER |
|---|---|---|---|---|---|
| Holistic | PCA | 43.0% | 64.4% | 0.866 | 37.87% |
| Handcrafted I | POEM | 65.2% | 85.0% | 0.948 | 31.68% |
| | BSIF | 63.8% | 83.4% | 0.939 | 30.82% |
| | LBP | 62.0% | 82.6% | 0.939 | 30.00% |
| | LPQ | 59.6% | 84.2% | 0.942 | 30.52% |
| | RILPQ | 55.0% | 79.2% | 0.926 | 34.07% |
| Handcrafted II | HOG | 64.2% | 86.2% | 0.955 | 29.33% |
| | DSIFT | 57.8% | 78.4% | 0.916 | 32.99% |
| | GABOR | 50.2% | 75.6% | 0.911 | 32.56% |
| Learned | CNN | 64.2% | 86.2% | 0.957 | 22.89% |
| Sum fusion | CNN + HOG | 75.6% | 90.6% | 0.972 | 22.87% |
| | CNN + POEM | 75.4% | 90.4% | 0.968 | 24.29% |
| | CNN + LPQ | 72.8% | 88.6% | 0.966 | 23.61% |
| | CNN + RILPQ | 72.0% | 90.6% | 0.962 | 25.11% |
| | HOG + BSIF | 70.8% | 88.6% | 0.963 | 28.34% |
| | CNN + BSIF | 70.2% | 89.8% | 0.963 | 24.18% |
| | CNN + LBP | 70.0% | 89.4% | 0.964 | 23.53% |

TABLE 5-continued

Individual and fusion results for all descriptors in Section 5 using the AWE database. Individual results were grouped by descriptor type, and handcrafted features were grouped in to categories, the first one (Handcrafted I) for methods based on neighborhood encoding and the second one (Handcrafted II) for methods based on gradient orientations.

| Type | Descriptors | Rank-1 | Rank-5 | AUC | EER |
|---|---|---|---|---|---|
| | HOG + RILPQ | 70.0% | 86.4% | 0.957 | 29.89% |
| | CNN + GABOR | 69.4% | 88.6% | 0.963 | 24.56% |
| | HOG + LPQ | 69.0% | 86.4% | 0.960 | 28.67% |

As may be observed, although learned features and top handcrafted features perform equally well individually for rank-1 and rank-5, fusion results are dominated by CNN combinations. It is believed that this is caused by a larger correlation among handcrafted features, which usually have a similar design inspiration that was exploited in slightly different ways by different experts (e.g quantise gradients, encode neighbours). Thus, CNN is probably learning something complementary to the experts' knowledge, which is corroborated by the fact that nearly all combinations between CNN and one handcrafted feature perform better than all combinations between two handcrafted features.

In the second round of fusion experiments, two experiments proposed by Emersic et al. were proposed to evaluate challenge participants using the UERC database. One experiment evaluates the overall performance and the other evaluates the scalability of the recognition approaches. To this end, the UERC training images were normalized and then used to learn a sixth CNN descriptor (i.e. data augmentation was used to balance the classes in a way that each subject ended up with 200 images). As UERC test images do not have the same orientation and ground truth annotations are not provided, a simple side classifier was also trained by changing the output size of the network presented in Table 1 to two classes (left and right) and then training it for the UERC training images using softmax loss and the Adam optimization algorithm. As the images from this database are already cropped, the entire testing process was fully automatic.

Figure 8A:
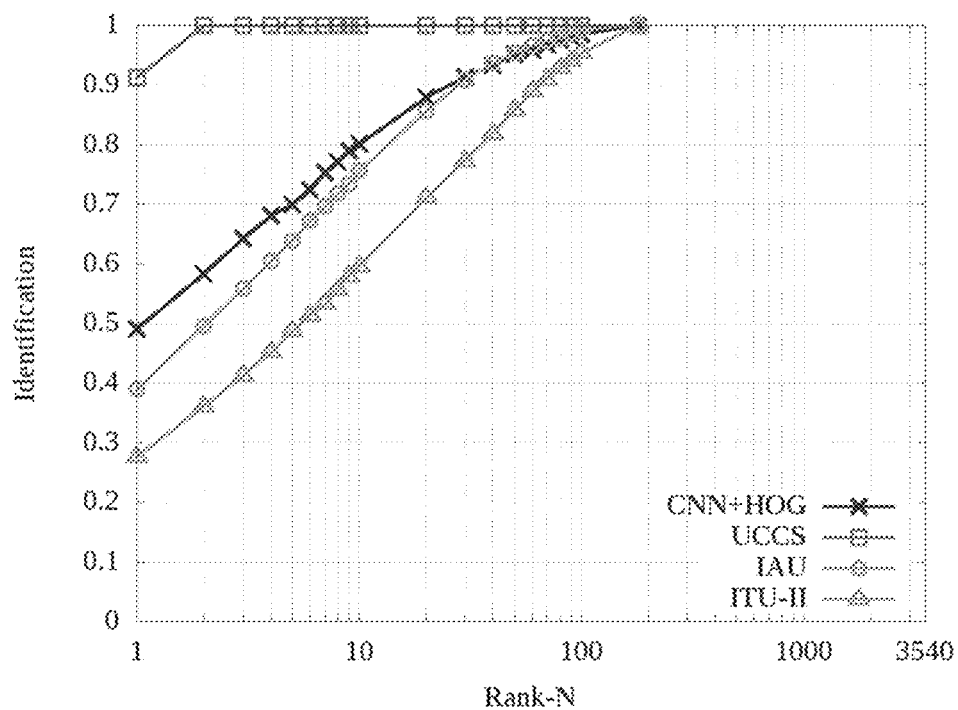
FIG. 8A is a graphical illustration of the CMC curves for all participants of the UERC challenge plus the best fusion results obtained by combining CNN and HOG considering the overall performance evaluation.

For the overall performance evaluation, only the first 1,800 test images from 180 subjects are used in an all-versus-all comparison. In this experiment, only CNN and three other handcrafted features were used: HOG, POEM and LBP. HOG and POEM obtained the best fusion results with CNN in Table 5, and LBP was a baseline approach for participants of the UERC challenge. Table 6 shows individual results for each feature, results using sum fusion and the best results reported in the UERC challenge. As may be observed, the normalization in the present embodiment resulted in a considerable boost in the performance for handcrafted descriptors. A more than 20% improvement was achieved in rank-1 when comparing the LBP result to its baseline version without normalization. Again, individual ranking performances of learned and handcrafted features were similar, but the CNN fusion pairings stood out. The performance was higher than all participants of the challenge except University of Colorado at Colorado Springs (UCCS), whose results have not been verified. It seems that they may be using test images for training. Cumulative match characteristic (CMC) curves for the best performing works are presented in FIG. 8A.

TABLE 6

Individual and fusion results for CNN, HOG, POEM and LBP in the overall performance evaluation through the UERC protocol, as well as the topn scoring participants of the UERC challenge.

| Type | Descriptors | Rank-1 | Rank-5 | AUC | EER |
|---|---|---|---|---|---|
| Hand-crafted I | POEM | 36.83% | 58.44% | 0.907 | 36.17% |
| | LBP | 35.00% | 55.11% | 0.897 | 35.81% |
| Hand-crafted II | HOG | 39.78% | 60.56% | 0.916 | 35.51% |
| Learned | CNN | 36.94% | 60.56% | 0.930 | 26.77% |
| Sum fusion | CNN + HOG | 49.06% | 69.94% | 0.951 | 27.84% |
| | CNN + POEM | 47.28% | 70.00% | 0.948 | 28.21% |
| | CNN + LBP | 45.22% | 67.44% | 0.946 | 28.05% |
| | HOG + POEM | 43.06% | 64.33% | 0.926 | 35.14% |
| | HOG + LBP | 41.22% | 60.89% | 0.919 | 35.11% |
| | POEM + LBP | 38.56% | 59.00% | 0.911 | 35.39% |
| Literature | UCCS [5] | 90.4%* | 100.0%* | 0.994* | |
| | IAU [5] | 38.5% | 63.2% | 0.940 | |
| | ITU-II [5] | 27.3% | 48.3% | 0.877 | |
| | LBP-baseline [5] | 14.3% | 28.6% | 0.759 | |

*These results still require verification.

For the scalability evaluation, all images from subjects with at least two images were matched to all other test images, totaling 7,442×9,499 matching pairs. This experiment increased the number of subjects to 3,540 and also added many images with poor quality, affecting considerably the performance of the evaluated approaches.

Figure 8B:
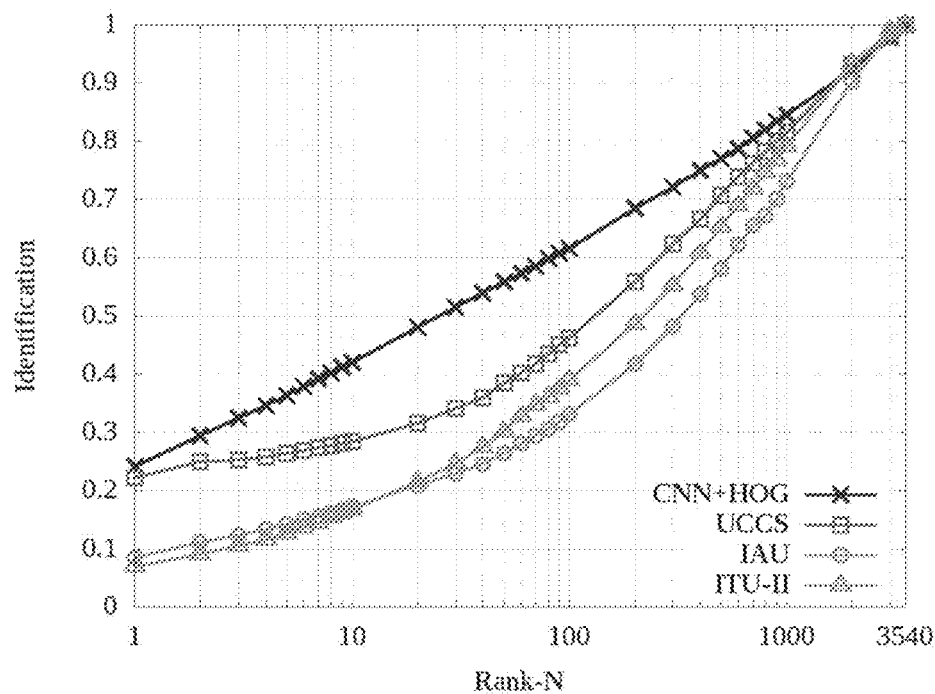
FIG. 8B is a graphical illustration of the CMC curves for all participants of the UERC challenge plus the best fusion results obtained by combining CNN and HOG considering the scalability evaluation protocols.

Table 7 shows the results for CNN, HOG and POEM, for all possible fusion among two of them, and for the best performing approaches in the UERC challenge. It can be seen that the combination of CNN and HOG was again the best performing method for lower ranks, and that these results show that the present approach is the most scalable unconstrained ear recognition approach. CMC curves for the best performing works are presented in FIG. 8B and show how well the present approach performs for lower ranks, outperforming all other works by at least 10% in most ranks before rank-300.

TABLE 7

Individual and fusion results for CNN, HOG and POEM in the scalability evaluation through the UERC protocol, as well as the top scoring participants of the UERC challenge.

| Type | Descriptors | Rank-1 | Rank-5 | AUC | EER |
|---|---|---|---|---|---|
| Handcrafted I | POEM | 17.98% | 28.48% | 0.851 | 40.38% |
| Handcrafted II | HOG | 18.50% | 28.78% | 0.851 | 40.80% |
| Learned | CNN | 17.13% | 28.73% | 0.873 | 35.92% |
| Sum fusion | CNN + HOG | 24.17% | 36.43% | 0.881 | 36.24% |
| | CNN + POEM | 23.02% | 35.70% | 0.882 | 35.82% |
| | HOG + POEM | 20.57% | 32.12% | 0.856 | 40.26% |
| Literature | UCCS [5] | 22.3%* | 26.3%* | 0.858* | |
| | IAU [5] | 8.4% | 14.2% | 0.810 | |
| | ITU-II [5] | 6.9% | 12.8% | 0.844 | |

*These results still require verification.

Table 7 also shows that the present CNN outperformed the other two top-scoring CNN-based approaches proposed by researchers from the Islamic Azad University (IAU) and the Istanbul Technical University (ITU-II). Similar to Zhou and Zaferiou, IAU and ITU-II employed transfer learning approaches in a network from a different domain and were not able to achieve results as high as the domain-specific CNN of the present invention.

Unconstrained ear recognition is a very challenging problem and recent efforts to provide data for unconstrained ear images for research are helpful. Initial databases such as IIT and WPUTE were captured images instead of wild images.

They do not have much intraclass and interclass variations. The initial wild databases collected from the Internet such as AWE and ITWE still lack interclass variability due to their small number of subjects. The UERC database is a vast repository with thousands of subjects and images with intraclass variations and interclass variations. It is the most challenging ear dataset currently known to be available.

Although initial ear recognition works have consistently used ear alignment before recognition, researches for unconstrained ear recognition were mostly focused on finding robust features. Even among the UERC participants, only the Imperial College London (ICL) has used an alignment step, although they used an AAM-based solution that may not be as successful for wild images as recent techniques such as CNNs (see FIG. 7). Nevertheless, a big part of the success in the results of the method of the present invention is attributed to the normalization step. It considerably increased the performance of traditional methods, such as handcrafted features in Tables 3 and 6, and also helped the deep learning process by allowing it focus on what matters the most for the recognition task. It also helped in the cross-dataset experiments shown in Table 4, as problems with different cropping areas or noise in ear location do not exist.

The CNN descriptors of the present invention were not only comparable to the best handcrafted descriptors in terms of rank-N results, but they also performed better in terms of EER in all experiments, meaning that they were more accurate for verification purposes. In addition, the present performance was favorably compared to the best performing participants of the UERC challenge, as shown in Table 7, and to other state-of-the-art work. There were two factors that may have helped to achieve these results: CNNs were trained from scratch specifically to the problem domain and a discriminative learning technique based on centre loss was used.

Finally, as learned and handcrafted features were achieving similar ranking results for the normalized images, it was decided to combine them through score fusion in order to seek a better performance rate. It was discovered that the combination of the CNN descriptors and handcrafted descriptors achieved much better results in all experiments. None of the combinations between a pair of handcrafted features could get close to the top scores, which may be explained by the fact that handcrafted features are highly correlated due to their similar design. On the other hand, CNN descriptors do not follow an expert's design and are likely learning some discriminative information that is complementary to most handcrafted descriptors, as may be observed in Tables 5, 6 and 7.

Unconstrained ear recognition is a very challenging problem. To address this challenge, a framework is provided that combines handcrafted features and CNN. The framework was tested using the most challenging publicly available ear database available. The results are considerably better than recently published works and are less impacted by database scale. Invaluable lessons have been gained that can further enhance unconstrained ear recognition research:

Accordingly, the CNN descriptor of the present invention outperforms other CNN-based works known in the literature, specially in more difficult scenarios. The fusion of learned and handcrafted matchers appears to be complementary as it achieved the best performance in all experiments. The obtained results outperformed all other reported results for the UERC (Unconstrained Ear Recognition Challenge), which contains the most difficult database available.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The term "image capture device" as used herein shall mean the source of a digital still or video image. In addition to traditional still and video cameras, for purposes herein an image capture device could include, for example, a storage medium having a video file stored thereon.

The term "image" as used herein shall mean a physical image, a physical data file, stored on a storage media or stored on online storage, containing one or more images in any format, an image in any format obtained directly from an image sensor, such as a camera, in real time or otherwise, a scanned image, a single image or a video containing a series of image frames.

The term "processor" as used herein shall mean an integrated circuit that contains all the functions for processing. This includes, for example, graphics processing units (GPUs), field-programmable gate array (FPGA), a traditional computer processor, or any other means of executing program instructions or otherwise processing data.

The term "landmark detection module" as used herein shall mean circuitry comprising both firmware and software that contains all the functions for performing landmark detection in accordance with the framework provided by the present invention.

The term "ear recognition module" as used herein shall mean circuitry comprising both firmware and software that contains all the functions for performing ear recognition in accordance with the framework provided by the present invention.

What is claimed is:

1. A method for ear biometric identification of a subject of interest, the method comprising:
    acquiring, from an image capture device coupled to a computing device, an image of a subject of interest, wherein the image includes an ear of the subject of interest;
    extracting an image of the ear of the subject of interest from the image of the subject of interest;
    detecting a plurality of landmarks of the image of the ear of the subject of interest, wherein the plurality of landmarks are selected from one or more characteristics of the outer ear including helix, crus antihelices, antihelix, scapha, antitragus, fossa triangularis, crus helicis, canum conchae, tragus and lobule;
    normalizing the image of the ear to a standard configuration based on the plurality of detected landmarks to generate a normalized image of the ear;
    extracting a plurality of discriminant features from the normalized image of the ear to generate a plurality of descriptors for the normalized image of the ear, wherein the plurality of discriminant features includes Convolutional Neural Network (CNN)-learned features and handcrafted features;
    comparing the plurality of discriminant features extracted from the normalized image of the ear to a plurality of database images of ears to identifying a plurality of matching scores, wherein the plurality of matching scores include CCN-learned matching scores and handcrafted matching scores;
    fusing the CNN-learned matching scores and the handcrafted matching scores to generate a plurality of fused matching scores; and
    determining an identify of the subject of interest based upon the plurality of fused matching scores.

2. The method of claim 1, wherein extracting an image of the ear of the subject of interest from the image of the subject of interest includes one or more of, cropping the image to extract the ear and determining the ground truth location of the ear.

3. The method of claim 1, wherein detecting a plurality of landmarks of the image of the ear of the subject of interest is performed by a pre-trained Convolutional Neural Network (CNN)-based landmark detector.

4. The method of claim 1, wherein normalizing the image of the ear to a standard configuration based on the plurality of detected landmarks further comprises reshaping the image of the ear using one or more of translating, rotating and scaling the image of the ear.

5. The method of claim 1, wherein comparing the plurality of discriminant features extracted from the normalized image to a plurality of database images of ears to identifying a plurality of matching scores, wherein the plurality of matching scores include CCN-learned matching scores and handcrafted matching scores, further comprises comparing the plurality of discriminant features using a distance metric of the discriminant feature.

6. The method of claim 1, further comprising normalizing the CNN-learned matching scores and the handcrafted matching scores prior to fusing the CNN-learned matching scores and the handcrafted matching scores.

7. The method of claim 1, wherein the handcrafted features are detected by one or more of Histogram of Gradient (HOG) detection, Patterns of Oriented Edge Magnitudes (POEM) detection and Local Binary Pattern (LBP) detection.

8. The method of claim 1, where the image of the subject of interest is selected from a constrained image and an unconstrained image.

9. The method of claim 1, wherein the image of the ear of the subject of interest comprises at least one ear occlusion.

10. The method of claim 1, wherein the plurality of database images of ears is selected from constrained images and unconstrained images.

11. A computing device for performing ear biometric recognition, the device comprising:
    a memory and at least one processor for acquiring an image of a subject of interest, wherein the image includes an ear of the subject of interest;

a landmark detection circuit operable by the at least one processor to extract an image of the ear of the subject of interest from the image of the subject of interest; to detect a plurality of landmarks of the image of the ear of the subject of interest, wherein the plurality of landmarks are selected from one or more characteristics of the outer ear including helix, crus antihelices, antihelix, scapha, antitragus, fossa triangularis, crus helicis, canum conchae, tragus and lobule; to normalize the image of the ear to a standard configuration based on the plurality of detected landmarks to generate a normalized image of the ear; to extract a plurality of discriminant features from the normalized image of the ear to generate a plurality of descriptors for the normalized image of the ear, wherein the plurality of discriminant features includes Convolutional Neural Network (CNN)-learned features and handcrafted features; and an ear recognition circuit operable by the at least one processor to compare the plurality of discriminant features extracted from the normalized image of the ear to a plurality of database images of ears to identifying a plurality of matching scores, wherein the plurality of matching scores include CCN-learned matching scores and handcrafted matching scores; to fuse the CNN-learned matching scores and the handcrafted matching scores to generate a plurality of fused matching scores; and to determine an identify of the subject of interest based upon the plurality of fused matching scores.

12. The device of claim 11, wherein the landmark detection circuit is further operable by the at least one processor to extract an image of the ear of the subject of interest from the image of the subject of interest by including one or more of, cropping the image to extract the ear and determining the ground truth location of the ear.

13. The device of claim 11, wherein the landmark detection circuit is operable by the at least one processor to normalize the image of the ear to a standard configuration based on the plurality of detected landmarks by reshaping the image of the ear using one or more of translating, rotating and scaling the image of the ear.

14. The device of claim 11, wherein the ear recognition circuit is operable by the at least one processor to compare the plurality of discriminant features extracted from the normalized image to a plurality of database images of ears to identifying a plurality of matching scores using a distance metric of the discriminant feature.

15. The device of claim 11, wherein the ear recognition circuit is further operable to normalize the CNN-learned matching scores and the handcrafted matching scores prior to fusing the CNN-learned matching scores and the handcrafted matching scores.

16. The device of claim 11, wherein the handcrafted features are detected by one or more of Histogram of Gradient (HOG) detection, Patterns of Oriented Edge Magnitudes (POEM) detection and Local Binary Pattern (LBP) detection.

17. The device of claim 11, where the image of the subject of interest is selected from a constrained image and an unconstrained image.

18. The device of claim 11, wherein the image of the ear of the subject of interest comprises at least one ear occlusion.

19. The device of claim 11, wherein the plurality of database images of ears is selected from constrained images and unconstrained images.

20. One or more non-transitory computer-readable media having computer-executable instructions for performing a method of running a software program on a computing device, the computing device operating under an operating system, the method including issuing instructions from the software program comprising: acquiring, from an image capture device coupled to a computing device, an image of a subject of interest, wherein the image includes an ear of the subject of interest; extracting an image of the ear of the subject of interest from the image of the subject of interest; detecting a plurality of landmarks of the image of the ear of the subject of interest wherein the plurality of landmarks are selected from one or more characteristics of the outer ear including helix, crus antihelices, antihelix, scapha, antitragus, fossa triangularis, crus helicis, canum conchae, tragus and lobule; normalizing the image of the ear to a standard configuration based on the plurality of detected landmarks to generate a normalized image of the ear; extracting a plurality of discriminant features from the normalized image of the ear to generate a plurality of descriptors for the normalized image of the ear, wherein the plurality of discriminant features includes Convolutional Neural Network (CNN)-learned features and handcrafted features; comparing the plurality of discriminant features extracted from the normalized image to a plurality of database images of ears to identifying a plurality of matching scores, wherein the plurality of matching scores include CCN-learned matching scores and handcrafted matching scores; fusing the CNN-learned matching scores and the handcrafted matching scores to generate a plurality of fused matching scores; and determining an identify of the subject of interest based upon the plurality of fused matching scores.

* * * * *